Figure 1:
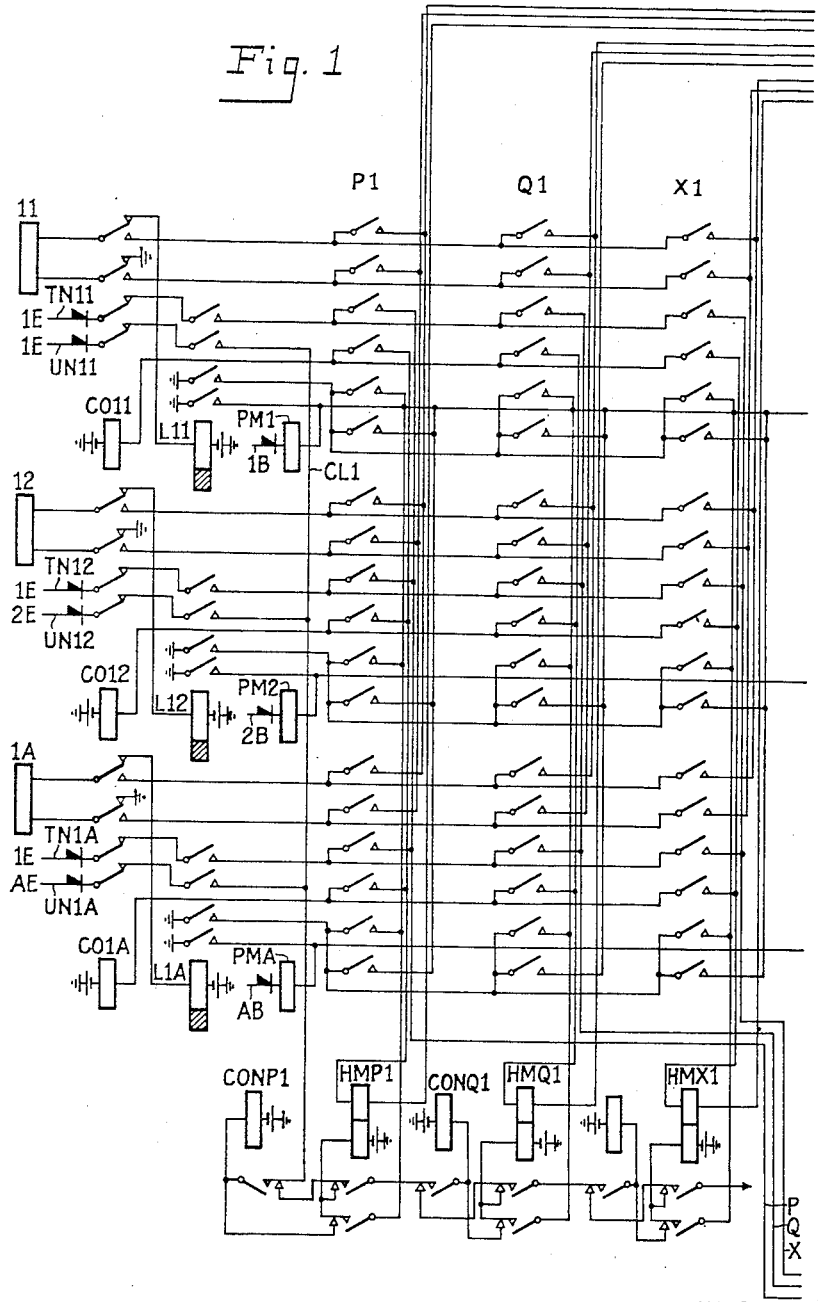

Aug. 7, 1956

R. MERCER 2,758,156

TELECOMMUNICATION SYSTEMS

Filed Oct. 18, 1951

4 Sheets-Sheet 1

INVENTOR
RICHARD MERCER
BY Lippincott & Smith
ATTORNEYS

INVENTOR
RICHARD MERCER
BY Lippincott & Smith
ATTORNEYS

UNITED STATES PATENT OFFICE

2,758,156
TELECOMMUNICATION SYSTEMS

Richard Mercer, London, England

Application October 18, 1951, Serial No. 251,897

Claims priority, application Great Britain
October 25, 1950

4 Claims. (Cl. 179—18)

The present invention relates to circuit arrangements for use in telecommunication systems and is more particularly concerned with circuit arrangements for controlling the operation of cross-bar switches.

The object of the present invention is to make use of a continuously-operated cyclic device to effect control of that switch of the static type known as a cross-bar switch in which the operation of a selected one of a number of prepare magnets enables a control magnet to operate a set of contacts corresponding to the prepare magnet operated.

According to the present invention the operation of a cross-bar switch is effected in such a way that the instant of operation of a selected prepare magnet and of a selected hold magnet is determined at a single selected phase of a cycle of a continuously operated cyclic device. This permits if required two or more selected prepare magnets to be operated at the same phase in a cycle as a single hold magnet as well as two or more hold magnets to be operated at the same phase in a cycle as a single prepare magnet. While there may arise conditions where two or more selected prepare magnets and two or more hold magnets may be required to be operated at the same phase in a cycle, such conditions owing to the increasing multiplicity of related connections involved will be comparatively rare. Usually the controls of each individual operation of a prepare magnet and a hold magnet will require to take place at a different phase from that of other operations which are required.

A subsidiary feature of the invention is that each prepare magnet is pre-arranged to be operated at a distinctive phase in a cycle and the hold magnet is operated at that phase in a cycle which correspond to the prepare magnet which determines which set of contacts of those which the hold magnet controls is to be operated.

A further feature of the invention is a cross-bar switch adapted to be controlled by a cyclical generator so as to function as a finder switch, the same cross-bar switch may be used as a primary finder switch for a number of groups of lines or it can be used as a secondary finder switch or it can be used as a combined primary and secondary cross-bar switch.

Generally speaking the operation is such that each set of contacts controlled by a hold magnet can be selectively operated entirely independent of any other hold magnet so that two or more hold magnets which require to operate sets of contacts controlled by the same prepare magnet may be operated at the same phase if required to set up quite distinct connections.

Figure 2:
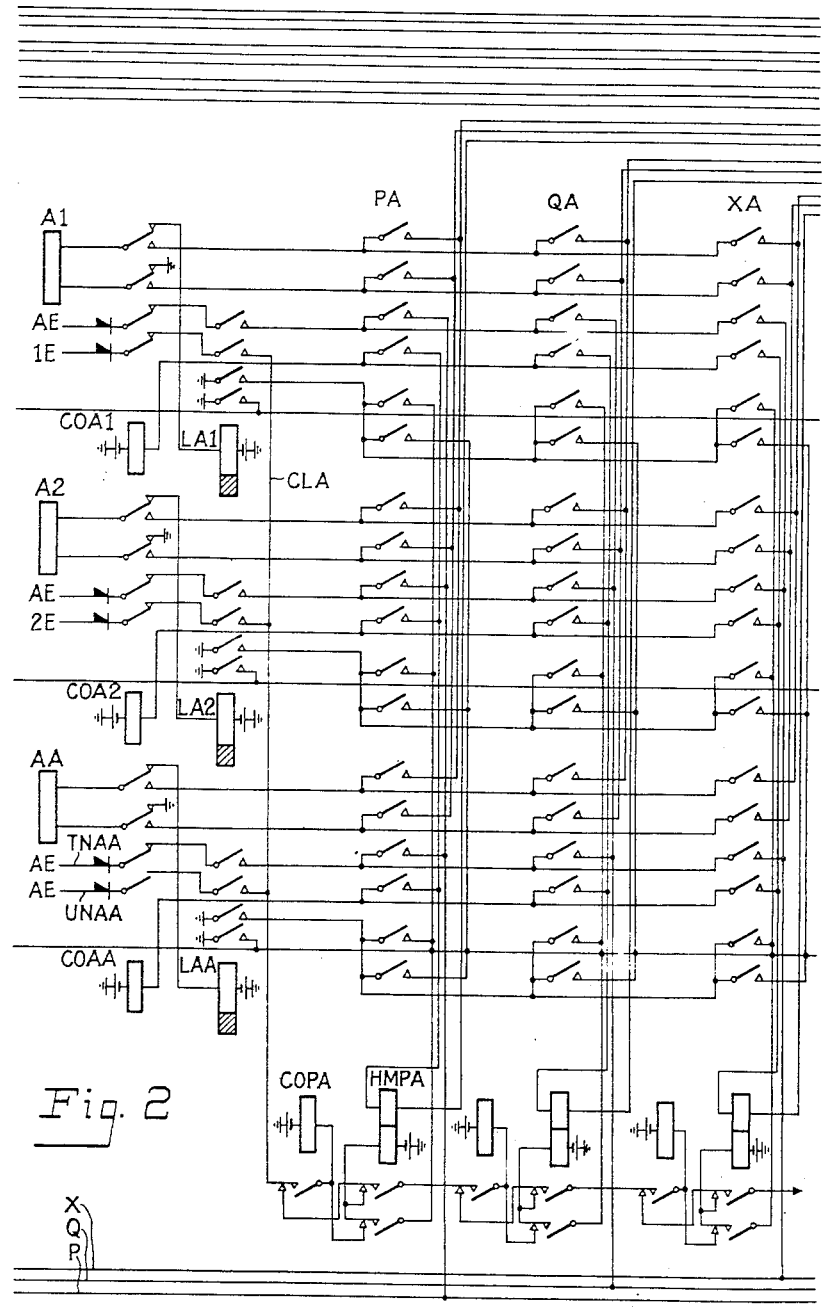
Figure 3:
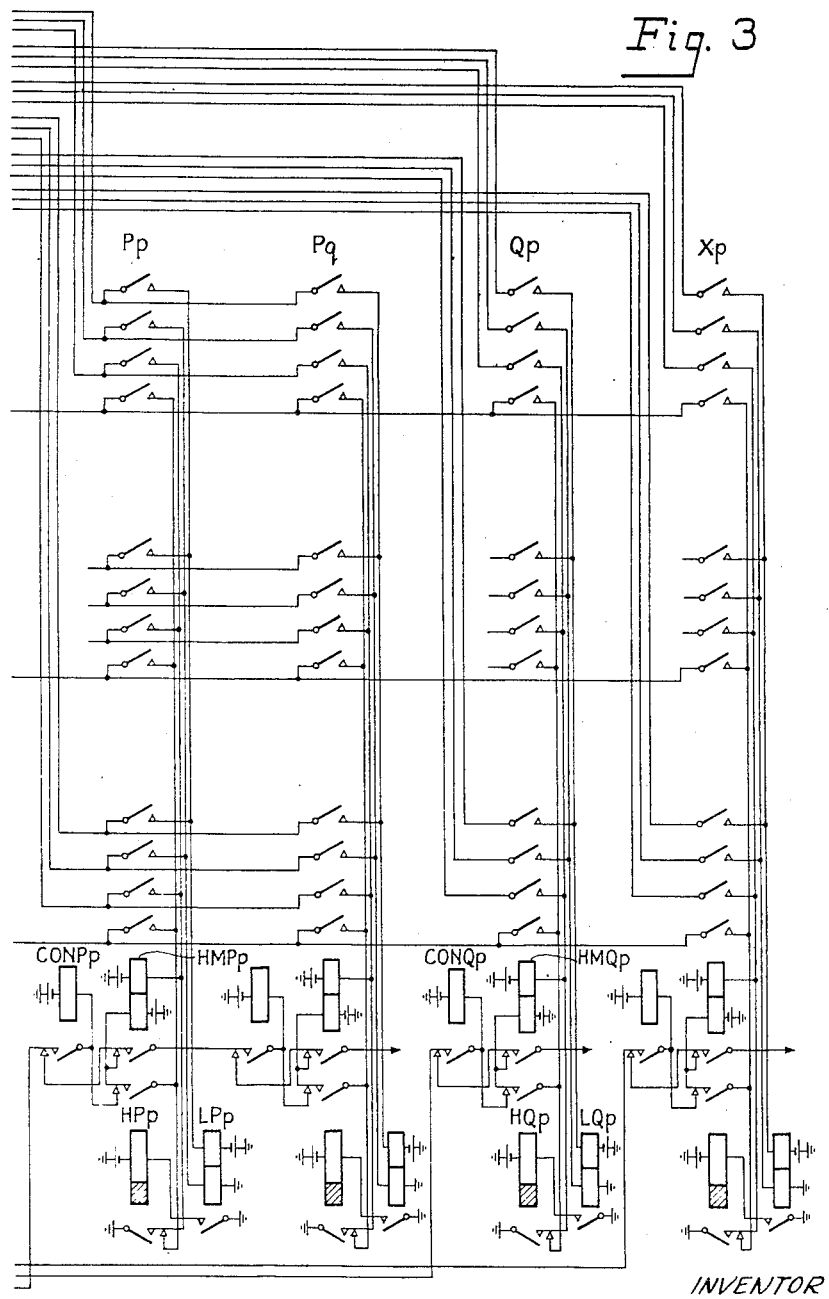

The invention will be better understood from the following description of one embodiment taken in conjunction with the accompanying drawings comprising Figs. 1 to 4 of which Figs. 1 to 3 should be arranged side-by-side with Fig. 1 on the left to give a complete circuit. The drawings show the invention applied to cross-bar switches arranged to act as primary and secondary finder switches but it will of course be understood that this application is given purely by way of example and that the invention has general application to cross-bar switches irrespective of their particular use.

Referring to the drawings, a single cross-bar switch is shown having columns of contacts sets P1, Q1, X1, PA, QA, XA, P$p$, P$q$, Q$p$, X$p$. The columns P1, Q1 and X1 are arranged to act as a primary finder switch giving access to a group of 10 lines of which three only are shown, namely 11, 12 and 1A. The columns PA, QA and XA represent a similar finder switch giving access to a second group of 10 lines of which again three only are shown, namely A1, A2 and AA. The two columns P$p$ and P$q$ represent secondary finder switches giving access to the first choice primary finder switches such as P1 and PA for each group of lines while the column Q$p$ also represents a secondary finder switch giving access to the second choice primary finder switches such as Q1 and QA. Finally the column X$p$ represents a finder switch giving access to the last choice primary finder switches such as X1 and XA. It will be appreciated that in actual practice, different cross-bar switches might be employed for the primary and secondary finder switches but it is more convenient to illustrate a single switch showing not only how primary and secondary switches may be operated alone but also how they operate together.

It will be appreciated that P1, Q1, X1 are alternative switches functioning as finders for giving access to a calling line but such switches can also be controlled if desired to act as final selector switches. Similarly PA, QA, XA constitute switches giving alternative means of access to another group of calling lines. P$p$ and P$q$ are representative of a number of vertical sets of contacts forming switches functioning as secondary finders to give access to a group of primary finders of which P1 and PA are given by way of example. Obviously the number of finders, such as P$p$ and P$q$ can be varied to suit different traffic requirements, two being given by way of example to enable the invention to be better understood. Q$p$ and X$p$ similarly represent single finders, each constituting one of a number giving access to the primary finders Q1, QA and X1, XA respectively.

A description will now be given of the operation of the switch and it will first be assumed that subscriber 11 wishes to set up a connection. On removing his handset, his line is looped and line relay L11 operates over back contacts of the cut-off relay CO11. Relay L11 in operating extends earth to one terminal of the prepare magnet PM1 which is individual to line 11 and also connects up two leads TN11 and UN11. Leads TN11 and UN11 have earth applied to them at phases in a cycle representative of the tens and units digits of the calling subscriber's number. In the present example earth will be applied to both leads at phase 1 of the cycle, as indicated by the references 1E adjacent the leads. In addition battery is connected to the second terminal of the prepare magnet PM1 at a phase in the cycle representative of the units digit of the calling subscriber, in this case at phase 1.

Thus at phase 1 of the cycle, the prepare magnet is operated from battery through the rectifier and winding of PM1, front contacts of L11 to earth. In addition, assuming the finder switch represented by contacts P1 to be idle, the following circuit is completed for hold magnet HMP1: earth at phase 1 on lead UN11, back contacts of cut off relay CO11, front contacts of L11, common lead CL1, back contacts of control relay CONP1, back contacts of hold magnet HMP1, winding of HMP1 to battery. A parallel branch of this circuit also extends over back contacts of HMP1, winding of control relay CONP1 to battery. The hold magnet and control relay thus operate and the hold magnet locks over its front contacts in parallel with the prepare magnet. The control relay locks over its front contacts to lead UN11, and opens the original circuit for itself and the hold magnet at its back contacts while maintaining a circuit for the hold magnet over its front contacts if that magnet has not already operated. It will be noted that the closing of the inner front contacts of the hold magnet would in the absence of the control relay extend lead UN11 to hold magnet HMQ1 and there is thus a possibility that earth would be applied to this lead for a sufficient length of time during phase 1 to cause the operation of the hold magnet HMQ1. This is prevented by the provision of the control relay which is operated as long as earth continues to be applied over lead UN11 and which while operated disconnects lead UN11 from hold magnet HMQ1 or from a subsequent hold magnet if HMQ1 is already energised.

Reverting to the operation of the switch, it will be understood that with prepare magnet PM1 and hold magnet HMP1 operated, the top set of contacts in column P1 are operated.

The operation of this set of contacts serves to extend lead TN11 through the back contacts of CO11, front contacts of L11 and the top set of P1 to lead P and thence over the back contacts of control relay CONPp (Fig. 3) and back contacts of HMPp to the lower winding of hold magnet HMPp assuming that this relay is not already operated i. e. assuming the secondary finder switch represented by Pp is idle. As previously explained earth is connected to lead TN11 at a phase in the cycle representative of the tens digit of calling subscriber's number. In this case the digit is 1 and hence earth is connected to lead TN11 at phase 1 of the cycle which may be the same cycle as cause the operation of HMP1. Consequently the hold magnet HMPp operates together with control relay CONPp. Although the prepare magnet PM1 is already operated, as previously described a second circuit is prepared for PM1 from another earthed contact of L11 and a contact of the set operated by HMP1. The operation of HMPp thus takes place and causes the top set of contacts Pp to be operated. Relay CONPp performs a similar operation to relay CONP1 described above. Hold magnet HMPp locks over its front contacts to earth at the front contacts of L11. This same earth is also extended over the back contacts of HPp to the upper winding of HMPp and also over the front contact of upper set of Pp, upper winding of HMP1, front contact of upper set of P1, winding of cut-off relay CO11 to battery. Relay CO11 operates and switches the subscriber's line through the primary and secondary finder switches to subsequent equipment which in Fig. 3 is shown as a line relay LPp and hold relay HPp. Line relay LPp operates and completes a circuit for hold relay HPp which provides an alternative earth for maintaining the hold magnets and the cut-off relay of the subscriber's line circuit. This alternative holding circuit is arranged to be completed before the earth from line relay L11 is disconnected, relay L11 being slow to release. A connection is thus completed from the subscriber's line circuit through the primary and secondary finder switches to the line circuit of the succeeding equipment. It will be noted that the connection is maintained by earth on the front contacts of HPp so that when the calling subscriber replaces his receiver and relay LPp releases followed by HPp, the circuits for hold magnets HMP1 and HMPp and the cut off relay CO11 will be opened, the magnets and relay will release and the contact sets P1 and Pp will be released.

The connection described above is one of the simplest which can be set up since it involves the operation of only one prepare magnet. Before proceeding to a description of a more complex connection some explanation will be given of the connections between the primary and secondary line switches and for this purpose it will be assumed that A shown in the drawings is 0, that is the lines are arranged in groups of 10 and hence each column of contacts comprises 10 sets. Referring now to the drawings it will be seen that the 10 outlets of the primary finder P1 which serves lines 11 to 10 are multipled together and taken to the top or first contact set of the secondary finder Pp; the 10 outlets of the primary finder Q1 which serves the same group of lines as the finder P1 are similarly multipled together and taken to the first contact set of the secondary finder Qp while the 10 outlets of the primary finder X1 are also multipled together and taken to the first contact set of the secondary finder Xp. The lines 21 to 20 are not shown in the drawing but it will be understood that the outlets from the first primary finder serving that group will be multipled together and taken to the second contact set of secondary finder Pp, the outlets from the second primary finder serving that group will be multipled together and taken to the second contact set of secondary finder Qp and the outlets from the third primary finder serving that group will be multipled together and taken to the second contact set of secondary finder Xp. The outlets of the primary finders serving the groups 31 to 30, 41 to 40 and so on will be similarly multipled together and taken to the 3rd, 4th and other contact sets of the appropriate secondary finders. Finally the multipled outlets of the primary finders PA, QA and XA i. e. PO, QO and XO serving the group 01 to 00 will be taken to the 10th contact sets of secondary finders Pp, Qp and Xp respectively.

With this arrangement it will be seen that a connection from a line having the same tens and units digit involves the operation of a single prepare magnet only, connections from all the other lines involve the operation of two prepare magnets, one corresponding to the units digit of the line number to extend the connection through the primary finder switch and the other corresponding to the tens digit to extend the connection through the secondary finder. The operation of the latter prepare magnet is effected by arranging that when any line relay in a group of lines is operated, a circuit is closed at a phase in a cycle corresponding to the tens digit of the group for the corresponding prepare magnet. Conveniently this may be done in a known type of cross-bar switch by arranging that earth is connected to the prepare magnet to be operated for the tens digit through contacts of the line relay and the lower contact set operated on the primary finder. Thus in Fig. 1, the lower contact of each set controlled from lines 11—1A respectively connects earth from its associated line relay to the prepare magnet PM1 and in Fig. 2 the lower contact of each set controlled from lines A1 to 6A respectively connects earth from its associated line relay to the prepare magnet PMA. It will be understood that these are consequential on using a single cross-bar switch as a primary and secondary finder and that the use of a separate switch for each purpose would require such connections to be made to the respective prepare magnets of the secondary finder.

A detailed description will now be given of a connection involving the operation of different prepare magnets for primary and secondary finders and it will be assumed that a call is initiated over line 12 and it will also be assumed that primary finder P1 is busy but that control relay CONP1 has released.

When the line is looped, line relay L12 operates, connects earth to one terminal of prepare magnet PM2, and also connects up leads UN12 and TN12. Consequently at phase 2 in the cycle prepare magnet PM2 is operated since battery is connected to its other terminal at this phase and earth is connected to lead UN12 and is extended over back contact of CO12, front contact of L12, back contact of CONP1, common lead CL1, front contact of HMP1, back contacts of CONQ1, and HMQ1 to battery through the lower winding of HMQ1 and to battery through the winding of CONQ1. Both the control relay and the hold magnet operate and the second contact set in column Q1 is thus operated. The circuit operations involved in the operation of relay CONQ1 are the same as those for relay CONP1 and will not be further described. When the second contact set in column Q1 is operated, the following circuit is completed at phase 1 of the next cycle: earth on lead TN12, back contact of CO12, front contact of L12, front contact of the second contact set in column Q1, lead Q, back contacts of control relay CONQ$p$ (Fig. 3) and hold magnet HMQ$p$, to battery through the lower winding of HMQ$p$ and to battery through the winding of CONQ$p$. Simultaneously at phase 1 of the cycle, earth is extended from the front contact of L12 through the front contact of the second set in column Q1, winding of prepare magnet PM1 to battery. Prepare magnet PM1 thus operates and the first contact set in column Q$p$ is operated. The cut off relay CO12 now operates in a circuit which includes hold magnets HMQ1 and HMQ$p$ and the line 12 is extended through the primary and secondary line finders to the line relay LQ$p$ of the succeeding equipment. The connection is maintained from earth at the front contact of hold relay HQ$p$ as previously described.

A description will now be given of the circuit operations in the case where two subscribers simultaneously lift their handsets and in the first place it will be assumed that simultaneous calling occurs within the same group of lines, for example over lines 11 and 1A. The two line relays L11 and L1A will operate substantially simultaneously and will prepare circuits for the prepare magnets PM1 and PMA. The order of operation of the prepare magnets PM1 and PMA will, however, depend on the phase during the cycle at which the line relays operated. Assume for example that the line relays operate at phase 2 in the cycle, then prepare magnet PMA will operate at phase A in the same cycle while prepare magnet PM1 will operate at phase 1 in the next cycle. The order in which the prepare magnets operate is immaterial, the important point being that they cannot operate at the same phase, thus avoiding any possible confusion in the setting up of the connections. Substantially simultaneously with the operation of prepare magnet PMA, hold magnet HMP1 operates and the connection is extended through the primary finger P1 to the secondary finder P$p$. At phase 1 in the next cycle, prepare magnet PM1 will operate as previously explained together with hold magnet HMQ1 and the connection will be extended through the primary finder Q1 (assuming finder Q1 is idle to the secondary finder Q$p$.) Also at phase 1, earth will be extended over lead TN1A, back contact of CO1A, front contact of L1A, front contact of the A set of contacts of column P1, lead P, back contacts of CONP$p$ and HMP$p$ (Fig. 3) to battery through the lower winding of HMP$p$ and to battery through the winding of CONP$p$. It will also be noted that earth may also be extended, if the period of operation of HMQ1 is sufficiently short, at the same phase 1 over lead Q from lead TN11, back contact of CO11, front contact of L11 and front contact of the first set of contacts of column Q1. The secondary finder P$p$ and possibly the secondary finder Q$p$ are thus operated and the subsequent operation of the cut off relay CO1A in the manner previously described extends line 1A to the line relay LP$p$ while line 11 may be extended to line relay LQ$p$. It will thus be seen that the operation of prepare magnet PM1 at phase 1 of the cycle in conjunction with the operation of hold magnets HMQ1 and HMP$p$ with the possibility of HMQ$p$ at the same phase controls a stage in the setting up of two connections, one by the operation of the primary finder Q1 and possibly secondary finder Q$p$ and the other by the operation of the secondary finder P$p$. If there is sufficient time for Q$p$ to operate the connection from line 11 is finally completed at phase 1 of the next cycle by the operation of the secondary finder Q$p$ in a manner similar to that described.

The operation would have been slightly different if simultaneous calls had been initiated from lines 12 and 1A. Assuming that calling takes place and at a phase between phase 2 and phase A say phase 7 in the cycle then prepare magnet PMA and hold magnet HMP1 will operate at phase A. At phase 1 of the next cycle, prepare magnet PM1 will operate together with hold magnet HMP$p$. At phase 2, prepare magnet PM2 will operate together with hold magnet HMQ1 and at instant 1 in the next cycle prepare magnet PM1 will operate again together with hold magnet HMQ$p$.

It will now be assumed that simultaneous calling takes place on two lines in different groups, for instance line 12 in the first group and line AA in the last group. The line relays L12 and LAA will operate substantially simultaneously and assuming that all the primary finders are idle and that the line relays operate at instant 7 in a cycle, prepare magnet PMA, hold magnet HMPA and relay COPA (Fig. 2) will be operated at phase A of the same cycle; prepare magnet PM2 will be operated at phase 2 of the next cycle together with hold magnet HMP1 and relay CONP1. The operation of PMA and HMPA at phase A extends the outlets of PA to P$p$ while the operation of PM2 and HMP1 at phase 2 of the next cycle extends the outlets of P1 to P$p$. At phase A of the same cycle, HMP$p$ operates to earth on lead TNAA and since prepare magnet PMA operates again at the same phase, P$p$ is seized from PA. Hold magnet HMP$p$ now holds over its upper winding in series with HMPA and COAA and line AA is switched through to line relay LP$p$ (Fig. 3). Regarding the connection from line 12, this cannot be completed over the secondary finder P$p$ since the hold magnet HMP$p$ is now held operated so that the operation of the prepare magnet PM1 at phase 1 of the next cycle is without effect as regards P$p$. However, at said phase 1, earth on lead TN12 is extended over back contact of CO12, front contact of L12, front contact of the operated contact set of P1, lead P, back contact of CONP$p$, front contact of HMP$p$, back contact of CONP$q$, back contact of HMP$q$ to battery over the lower winding of HMP$q$ and to battery over the winding of CONP$q$. Thus prepare magnet PM1 and hold magnet HMP$q$ operate at phase 1 and line 12 is then switched through to the secondary finder P$q$ and thence to the line relay LP$q$.

It will of course be understood that all simultaneous calls from different groups do not involve operations such as described above. For instance a connection from the first group of lines may be extended over P1 to P$p$ while a connection from the last group may be extended over QA and Q$p$. It is only in the case where the lines from the two groups take into use a first choice primary finder switch that the transfer has to take place during the secondary finding operation.

It will be noted that the circuits of the prepare magnets and the hold magnets as described above are completed simultaneously. This may be satisfactory in practice as a prepare magnet has a lighter loading than a hold magnet and also a lower resistance so that the time constant of the operating circuit is less. Nevertheless if the operation is found to be too marginal, steps may easily be taken to rectify this. For instance it may be arranged that the application of battery to the leads controlling the prepare magnets occurs slightly in advance of the application of earth to the tens and units leads.

Figure 4:
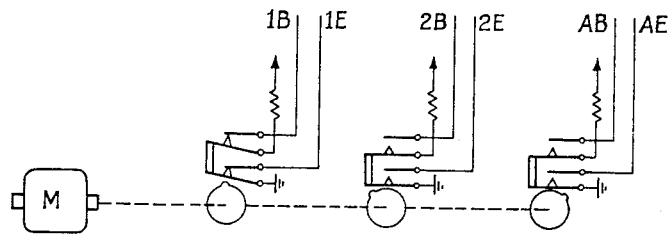

One form of the continuously-operated cyclic device for applying battery and earth to leads 1E to AE and 1B to AB respectively is shown in Fig. 4. The device consists of a total of A cams of which 3 only are shown mounted on a shaft driven continuously by the electric motor M. These cams as they rotate connect battery and earth successively to leads 1B, 1E; 2B, 2E and AB, AE. It will, of course, be understood that other forms of cyclic device could be used and the invention is in no way limited to the form shown.

I claim:

1. A line-finder control circuit comprising a line relay, a cut-off relay, a crossbar switch having a plurality of sets of contacts, a plurality of prepare magnets less than the number of sets of contacts, each prepare magnet when operated preparing a number of distinctive sets of contacts of said plurality for operation and a plurality of hold magnets also less than the number of sets of contacts which, on operation following on the operation of a prepare magnet, cause a particular one of the distinctive sets characteristic of the hold magnet and prepared by said prepare magnet to operate, a cyclically operated device, leads to which potential is adapted to be connected by said cyclically operated device at distinctive phases of a cycle, means controlled by said line relay for preparing a prepare magnet individual to said line relay for operation, means for selecting a hold magnet for operation, circuit arrangements controlled by said line relay including a lead to which potential is applied by said cyclic generator at a phase in a cycle characterizing said line relay for operating said prepare magnet assigned to such line relay at the commencement of said phase and a lead to which potential is applied at the same phase in a cycle for operating a selected hold magnet whereby both magnets are operated in the same phase of a cycle to operate a set of contacts distinctive of both the operated prepare and hold magnets, circuit means for operating said cut-off relay including a source of current and one of said operated set of contacts to cause said cut-off relay to open the operating circuits of said line relay and thereby the circuits of said prepare magnet and said hold magnet and circuit means for holding said hold magnet energized independently of its operating circuit.

2. A secondary line finder control circuit comprising a line relay, a cut-off relay, a primary line finder, a crossbar switch having a plurality of sets of contacts, a plurality of prepare magnets less than the number of sets of contacts, each prepare magnet when operated preparing a number of distinctive sets of contacts of said plurality for operation and a plurality of hold magnets also less than the number of sets of contacts which on operation following on the operation of a prepare magnet cause a particular one of the distinctive sets characteristic of the hold magnet and prepared by said prepare magnet to operate, a cyclically operated device, leads to which potential is connected by said cyclically operated device at distinctive phases of a cycle, means controlled by said line relay through said primary line finder for selecting a prepare magnet for operation, circuit means including contacts controlled by said line relay, operated selected contacts of said primary line finder and one of said leads for operating a selected prepare magnet at a distinctive phase of a cycle, circuit means including operated contacts of said primary finder and another of said leads for operating a selected hold magnet in the same phase of a cycle, circuit means for operating said cut-off relay including a source of potential, operated contacts of the set selected by said magnets and contacts of said primary finder to operate said cut-off relay to open the operating circuits of said prepare magnet, said line relay and said hold magnet, and circuit means for holding said hold magnet energized in a circuit independent of its operating circuit.

3. A primary and secondary finder control circuit comprising a line relay, a cut-off relay, a first crossbar switch unit serving as a primary finder, a second crossbar unit serving as a secondary finder, each crossbar unit having a plurality of sets of contacts, a plurality of prepare magnets less than the number of sets of contacts, each prepare magnet when operated preparing a number of distinctive sets of contacts of said plurality for operation and a plurality of hold magnets also less than the number of sets of contacts which on operation following on the operation of a prepare magnet cause a particular one of the distinctive sets characteristic of the hold magnet and prepared by said prepare magnet to operate, a cyclically operated device, leads to which potential is connected by said cyclically operated device at distinctive phases of a cycle, means controlled by said line relay for preparing a prepare magnet controlling the first crossbar unit and individual to said line relay for operation, means controlled by said line relay for preparing a selected magnet of said first crossbar unit for operation, circuit means including a lead to which potential is applied by said cyclic generator at a phase in a cycle characterizing said line relay as regards the control of the primary finder for operating said prepare magnet at the commencement of said phase and a lead for operating a selected hold magnet during the same phase of a cycle whereby both magnets controlling the primary finder crossbar unit are operated in the same phase of a cycle to operate a set of contacts distinctive of both the operated prepare and hold magnets, circuit means including one of said operated set of contacts and including a lead to which potential is applied by said cyclic generator at a phase in a cycle characterizing said primary finder crossbar unit for operating a prepare magnet of said secondary unit, circuit means including another of said operated set of contacts to which potential is applied during the same phase of the cycle whereby both magnets controlling the secondary finder crossbar unit are operated in the same phase of a cycle to operate a set of contacts distinctive of the last operated prepare and hold magnets, means including contacts of each of said operated sets of contacts and a source of potential for operating said cut-off relay and means controlled by said cut-off relay for opening the operating circuits of said prepare magnets and said hold magnets and means for holding said hold magnets operated independent of their operating circuits to maintain a continuous connection over other contacts of said operated sets of contacts in series.

4. A switch control circuit comprising a crossbar switch having a plurality of sets of contacts, a plurality of prepare magnets less than the number of sets of contacts, each of the prepare magnets, when operated, functioning to prepare a number of distinctive sets of contacts of said plurality for operation, and a plurality of hold magnets also less than the number of sets of contacts, said hold magnets, on operation, following on the operation of one of the prepare magnets causing a particular one of the distinctive sets characteristic of the hold magnet and prepared by said prepare magnet to operate, a cyclically operated device, a first set of leads to each of which potential is connected by said cyclically operated device at a distinctive phase of a cycle, a second set of leads to each of which potential is connected by said cyclically operated device at phases of a cycle each having a distinct time relationship to the phase at which potential is connected to the different ones of the first set of leads, means for selecting a prepare magnet for operation, means for selecting a hold magnet for operation, and circuit arrangements comprising a circuit including a selected prepare magnet and a selected one of said first set of leads and a circuit including a selected hold magnet and that one of the second set of leads to which potential is connected at a phase having the said time relationship to that connected to the selected lead of the first set whereby operations of the prepare and hold magnets are caused to take place in independent circuits at a definite time relationship.

References Cited in the file of this patent

UNITED STATES PATENTS

| | | |
|---|---|---|
| 2,291,040 | Holden | July 28, 1942 |
| 2,291,752 | Parker | Aug. 4, 1942 |
| 2,310,452 | Meacham | Feb. 9, 1943 |
| 2,519,849 | Ostline | Aug. 22, 1950 |
| 2,552,719 | Jacobaeus | May 15, 1951 |